United States Patent [19]

Whang

[11] Patent Number: 5,313,385
[45] Date of Patent: May 17, 1994

[54] UTILITY PROGRAM BACKUP APPARATUS

[75] Inventor: Chan-Yeong Whang, Suwon, Rep. of Korea

[73] Assignee: SamSung Electronics Co., Ltd., Suwon, Rep. of Korea

[21] Appl. No.: 698,985

[22] Filed: May 13, 1991

[30] Foreign Application Priority Data

Dec. 28, 1990 [KR] Rep. of Korea .................... 90-21413

[51] Int. Cl.5 .......................... G05B 9/02; G05B 19/42
[52] U.S. Cl. .................................... 364/184; 364/191; 364/187
[58] Field of Search ................... 364/184, 474.17, 187, 364/191, 192, 474.21, 474.22; 371/9, 1, 10.1

[56] References Cited

U.S. PATENT DOCUMENTS

| | | | |
|---|---|---|---|
| 4,396,987 | 8/1983 | Inaba et al. | 364/191 |
| 4,821,198 | 4/1989 | Takeuchi et al. | 364/474.21 |
| 4,884,211 | 11/1989 | Kishi et al. | 364/474.22 |
| 4,924,112 | 5/1990 | Anderson et al. | 364/184 |
| 4,926,309 | 5/1990 | Wu et al. | 364/474.17 |
| 4,956,765 | 9/1990 | Iwagaya | 364/192 |

FOREIGN PATENT DOCUMENTS 62-161355 10/1987 Japan .
2-59904 2/1990 Japan .................... 364/187

Primary Examiner—Jerry Smith
Assistant Examiner—Steven R. Garland
Attorney, Agent, or Firm—Robert E. Bushnell

[57] ABSTRACT

A utility program backup apparatus includes an erasable and programable read-only-memory, a ROM writer, first and second processing units, first and second memories, first and second interfaces a servo control part, a keyboard and a display. The apparatus enables an operator to shorten data recordation and reproduction time, while reducing an error rate of recordation and reproduction.

19 Claims, 3 Drawing Sheets

UTILITY PROGRAM BACKUP APPARATUS

FIELD OF THE INVENTION

The present invention pertains generally to a utility program backup apparatus for use with industrial robot controllers, and more particularly to a utility program storage and reproduction apparatus comprising, as storage means, an erasable and programmable read-only-memory which will be referred to as an EPROM hereinbelow.

DESCRIPTION OF THE PRIOR ART

It is well known in the art that industrial robot controllers usually employ cassette tapes, floppy disks or hard disks to store utility programs. Reference is made to Japanese Utility Model Publication(Kokai) No. 62-161355 which discloses a data recording device that employs a cassette tape to store edited programs permanently.

The data recording device taught in the above publication provides some beneficial effects over the conventional storage apparatus storing various data in a RAM region. More specifically, use of the above device makes it possible to overcome either the problem that the stored program may inadvertently be destroyed due to an operational mistake, or the shortcoming that the program may be erased because of failure of the power supply for an extended period of time. However, the data recording device cited above is still problematic in that a tape puncher or a magnetic recording unit is needed to perform the storage operation. It is further disadvantageous because the stored program has to be loaded into the RAM region prior to its use, thereby requiring time-consuming additional procedure.

Another example of the prior art is illustrated in FIG. 1 wherein a cassette tape may be employed to store utility programs for an industrial robot controller, as to which a brief description will be offered in in the following.

With the system in operation, a series of commands indicative of the operation sequence stored at the memory 2 is entered into the central processing unit 1 through a key board 4 so as to program the operation sequence of a robot.

In response to the commands, the central processing unit 1 will read sequentially the utility program stored at the memory 2 and then convert parallel digital data into serial data applied to a cassette interface 3. The digital data so applied is converted into analog data at the cassette interface 3, which in turn is recorded on the cassette tape 6 via a transmission cable. The above steps will be repeated until the data recordation on the cassette tape 6 is completed.

In order to reproduce those utility programs which already have been recorded on the cassette tape 6, the recordation step mentioned earlier should be carried out in a reverse order. In other words, if analog data is transmitted to the cassette interface 3 through the cable C, then the analog data will be converted into digital data acceptable by the central processing unit 1. Serial data applied to the central processing unit 1 is converted into parallel data for storage at the utility program storage region of the memory 2. The above data reproduction steps will be repeated until the reproduction operation comes to an end.

In such a conventional apparatus, parallel data has to be converted into serial data and vice versa prior to being recorded on and/or reproduced from the cassette tape to ensure that no errors may take place due to the variation of volume or performance of the cassette tape. This leads to a formidable problem that an extended period of time is required to either record or reproduce such data as utility programs and search for specific program recorded on the cassette tape.

SUMMARY OF THE INVENTION

With the foregoing prior art problems in view, it is an object of the present invention to provide an utility program backup apparatus comprising an EPROM which enables the operator to shorten the recordation and reproduction time of data, while reducing the error rate in the process of recordation and reproduction to an acceptable level.

In acccordance with the present invention, a utility program backup apparatus comprises a first central processing unit; a second central processing unit; a keyboard for providing signals to selectively store or retrieve the utility program; a display for indicating an error message if a previously stored utility program has an identical name to a key signal from said keyboard; a first interface for converting the data carried by the key signal to a format suitable for storage and retrieval of the utility program under the control of said first central processing unit ; a second interface for converting the data carried by the key signal to a format suitable for storage and retrieval of the utility program under the control of said second central processing unit; a first memory for storing the data converted by said first interface under the control of said first central processing unit; a second memory for restoring the data of said first memory in a converted format through said second interface; a ROM writer for the data of said second memory under writing or reproducing the control of said first central processing unit; a EPROM for storing the utility program written by said ROM writer; and a servo controller for controlling the robot operation based on the utility program written in said EPROM.

Other objects and features of the invention will become apparent from the following detailed description of the preferred embodiment with reference to the accompanying drawings.

DESCRIPTION OF THE PREFERRED EMBODIMENT

Figure 1:
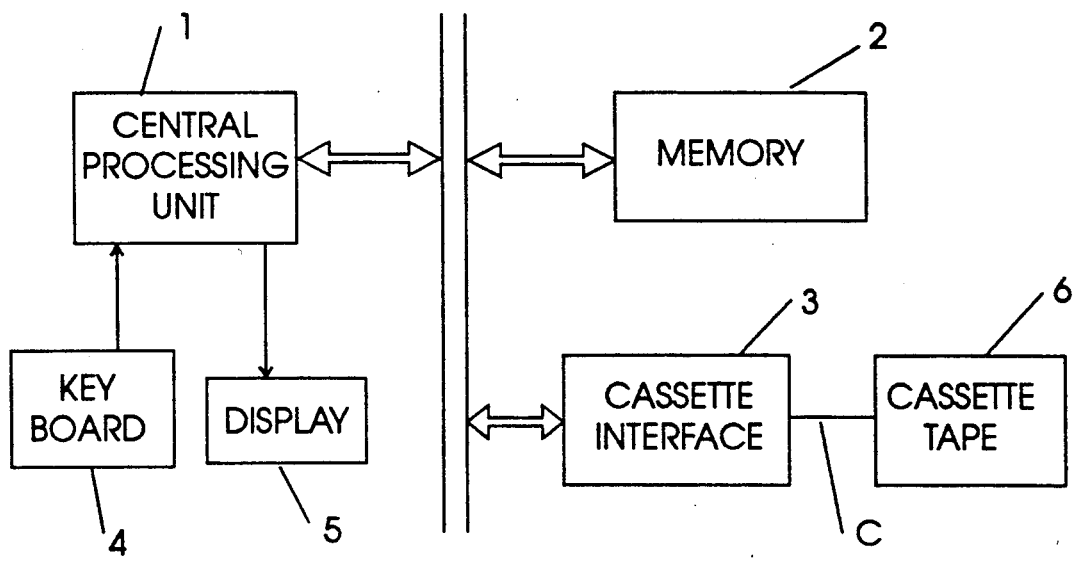
FIG. 1 is a block diagram showing a conventional utility program storage and reproduction apparatus which employs a cassette tape as a storage means.
Figure 2:
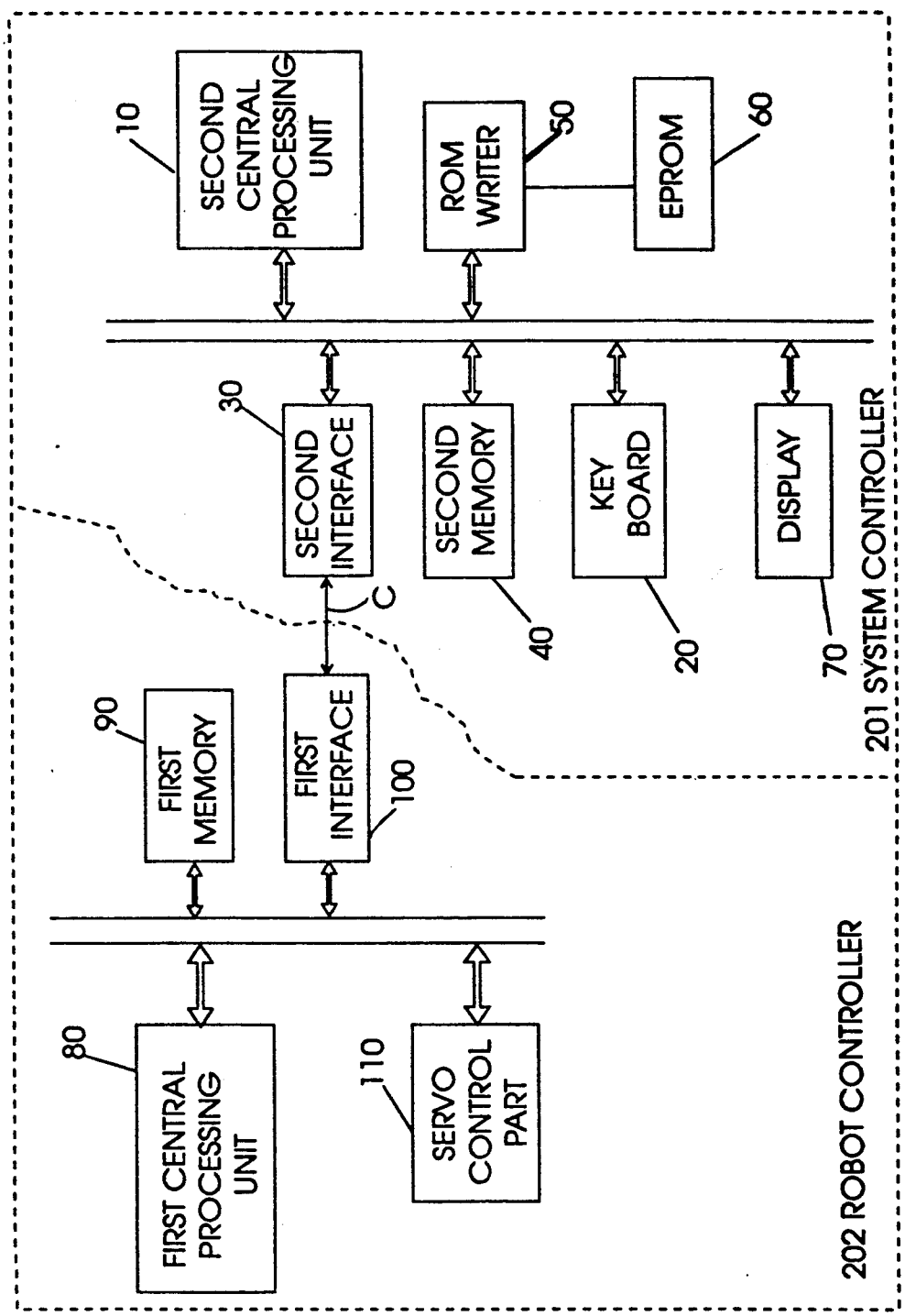
FIG. 2 is a block diagram illustrating an embodiment of the present invention in which an EPROM rather than the cassette tape is used as storage means.
Figure 3:
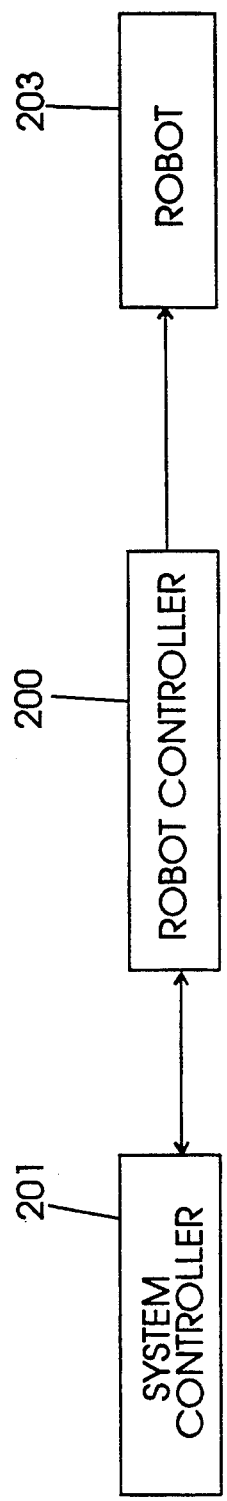
FIG. 3 is a block diagram showing a robot controller system to which the novel utility program backup apparatus may be applicable.

Referring now to the drawings, the system controller 201 shown in FIG. 3 is used to operate an industrial robot system by storing and retrieving the utility program or operation program. The system controller 201 may be either carried by the user or located at a desired position. In a preferred embodiment of the present invention, the system controller 201 comprises, as illustrated, in FIG. 2, a second central processing unit 10 and a keyboard 20 for providing signals to selectively store or retrieve the utility program. A second interface 30 is adapted to convert the data carried by the key signal to a format suitable for storage and retrieval of the utility program. The data so converted in the second interface 30 will be stored at a second memory 40. A ROM writer 50 reproduces the stored data from the second memory 40 and then writes it in an EPROM 60. The key signal produced by the keyboard 20 and the error messages will be indicated on a display 70 which is typically composed of a liquid crystal display.

A robot controller system 202 is coupled to a body of the industrial robot 203 to control the servo control part, e.g., the electric motor in response to the data supplied from the system controller 201. The robot controller 202 comprises, as depicted in FIG. 2, a first central processing unit 80, a first memory 90 for storing the data provided through the system the controller 201 from the keyboard 20 under the control of the first central processing unit 80, a first interface 100 for interfacing with the second interface 30 of the system controller 201, and a servo control part 110 for controlling the operation of the robot 203, i.e., the electric motor under the control of the first central processing unit 80.

The system controller 201 is coupled to the robot controller 202 by a length of cable C for data transmission.

In operation of the utility program backup apparatus so constructed, a recordation command signal will be entered through the keyboard 20 to store the utility program at the EPROM 60. Then, the key signal is indicated on the display 70 under the control of the first central processing unit 80. At this moment, the second central processing unit 10 determines whether the EPROM 60 is coupled to the ROM writer 50. If so, the second central processing unit 10 detects the key signal from the key board 20, then applies the key signal to the second interface 30 in the format of serial data.

The serial data applied to the second interface 30 under the control of the second central processing unit 10 will be transmitted via cable C to the first interface 100 of the robot controller 202 which converts the transmitted data to a format of parallel data that is to be supplied to the first central processing unit 80.

The data supplied to the first central processing unit 80 is stored at the first memory 90. Upon completion of such storage operation, the data array stored at the first memory 90 will be analyzed to determine whether it is a command to carry out writing into the EPROM 60. If such is the case, the first central processing unit 80 interrogates whether there is any program to be written into the EPROM 60, among the programs which were stored at the first memory 90.

When the interrogation indicates that there is a program to be written, this program will be re-edited and supplied to the first interface 100 on a block basis, after which the program will be applied through cable C to the second interface 30 in the format of parallel data. Within the second interface 30, said parallel data is converted to a serial data which will be stored at the second memory 40 under the control of the second central processing unit 10. At this moment, the second central processing unit 10 interrogates whether the EPROM 60 is coupled to the ROM writer 50. If such is the case, contents of the control block within the EPROM 60 will be interrogated to confirm whether a program having the same name as that to be written had already been stored.

When the confirmation reveals that a program of the identical name has already been stored, error messages will be indicated on the display 70, which in turn leads to discontinuity of the writing operation. To the contrary, if there ,is no .program written in the EPROM 60, the ROM writer 50 writes the program into the EPROM 60 which was re-edited on a block basis and stored at the second memory 40.

The servo control part 110 operates to control the electric motor and hence the robot 3 in accordance with the utility program written into the EPROM 60.

In order to retrieve the program written into the EPROM 60, said writing operation will be performed in a reverse order. In other words, if the second central processing unit 10 detects a key signal for retrieving the program written into the EPROM 60, the data will be supplied from the second interface 30 to the first interface 100.

Then, the first central processing unit 80 detects and stores the supplied data at the first memory 90, subsequent to which the stored data will be provided to the first interface 100 and then to the second interface 30 via cable C. In response to this, the second central processing unit 10 analyzes a digital data array to determine if a read command is present.

Should a read command be detected, the ROM writer 50 reads out the data from the EPROM 60 and transmits the data to the second interface 30. Subsequently, the data supplied to the second interface 30 will be transmitted to the first interface 100. Such data will finally be stored at the first memory 90 by means of the first central processing unit 80.

As set forth above, the utility program backup apparatus in accordance with the present invention provides such a beneficial effect over the prior art that storage and/or reproduction can be performed in a cost effective manner and within a reduced period of time, mainly because an EPROM is employed to store and retrieve the utility program.

While the invention has been shown and described with reference to a particular embodiment, it will be apparent to one skilled in the art that many modifications and changes may be made without departing from the scope of the invention as defined in the claims.

What is claimed is:

1. A utility program backup apparatus, comprising:
 a first processing unit;
 a second processing unit;
 means for providing a mode signal corresponding to one of storing and retrieving a utility program;
 a first interface for converting said mode signal to a format suitable for storage and retrieval in response to control by said first processing unit;
 a second interface, connected to said first interface, for converting said mode signal to a format suitable for storage and retrieval in response to control by said second processing unit;
 a first memory for storing the utility program and the converted mode signal received from said first interface;
 a second memory for storing the utility program received from the first memory via the first interface and the second interface;
 a ROM writer for writing the utility program of said second memory onto an EPROM in response to control by said first processing unit; and servo controller means for controlling robot operation in response to said utility program of said EPROM.

2. The apparatus as recited in claim 1, wherein said first interface and said second interface are adapted to convert data between a parallel format and a serial format.

3. The apparatus as recited in claim 1, further comprising a display indicating an error message when said second processing unit determines a name of said utility program stored in said EPROM being identical to a name of said utility program stored in said second memory.

4. The apparatus as recited in claim 3, wherein said display comprises a liquid crystal display.

5. A method for backing up a utility program for a robot controller connected to a system controller, said robot controller comprising a first memory and a first interface, said system controller comprising a second memory, a second interface and an EPROM, said method comprising the steps of:
 transmitting a backup command in series from said second interface of said system controller to said first interface of said robot controller;
 converting a utility program retrieved from said first memory of said robot controller from parallel to series format in said first interface;
 transferring said converted utility program from said first interface to said second interface;
 storing said converted utility program from the second interface to said second memory of said system controller; and
 writing said utility program stored in said second memory onto said EPROM.

6. The method, according to claim 5, further comprising the step of checking whether a name of said utility program stored in said EPROM is identical to a name of said utility program stored in said second memory.

7. The method of claim 5, further comprising the steps of:
 transmitting a retrieve command to said robot controller;
 reading said utility program stored in said EPROM; and
 storing said red utility program into said first memory.

8. A process for backing up a utility program of a robot controller, said process comprising the steps of:
 (a) receiving a record signal for storing said utility program in a non-volatile memory;
 (b) determining in a second processing unit if said non-volatile memory is coupled to means for writing to said non-volatile memory;
 (c) if said non-volatile memory is coupled to said means for writing, applying said record signal in series to a second interface by control of said second processing unit;
 (d) sending said record signal in series to a first interface;
 (e) converting said record signal in said first interface to parallel data;
 (f) supplying said parallel data to both a first processing unit and to a first memory;
 (g) determining if said parallel data stored in said first memory is a command for writing into said non-volatile memory;
 (h) if said parallel data stored in said first memory is the command for writing into said non-volatile memory, determining in said first processing unit if said utility program is stored in said memory;
 (i) if said parallel data stored in said first memory is the command for writing into said non-volatile memory and said utility program is stored in said first memory, re-editing said utility program and supplying said re-edited utility program in parallel to said first interface;
 (j) supplying said re-edited utility program form said first interface to said second interface;
 (k) converting in said second interface said re-edited utility program into series format and storing said converted re-edited utility program into a second memory by control of said second processing unit;
 (l) determining in the second processing unit if said non-volatile memory is coupled to said means for writing;
 (m) if said non-volatile memory is coupled to said means for writing, determining if a program stored in said non-volatile memory has a same identification as said converted re-edited utility program stored in said second memory.
 (n) if said program stored in said non-volatile memory has the same identification as said converted re-edited utility program stored in said second memory, providing an error message and ending said process; and
 (o) if said program stored in said non-volatile memory has a different said identification from said converted re-edited utility program stored in said second memory, storing by said means for writing said re-edited utility program from said second memory to said non-volatile memory.

9. The process of claim 8, wherein said record signal is received in step (a) from a keyboard.

10. The process of claim 8, further comprising the step of displaying one of said record signal and said error message.

11. The process of claim 8, wherein said non-volatile memory comprises an electrically programmable read only memory.

12. The process of claim 8, further comprising a step of retrieving said utility program stored in said non-volatile memory.

13. The process of claim 12, wherein said retrieving step comprises the steps of:
 (aa) receiving by control of said second processing unit a retrieve signal for retrieving said utility program stored in said non-volatile memory, and supplying said retrieve signal to said first interface;
 (bb) determining in said first processing unit if said retrieve signal at said first interface is a read command;
 (cc) if said retrieve signal at said first interface is the read command, reading said utility program stored in said non-volatile memory and transferring said read utility program to said first interface; and
 (dd) storing said read utility program from said first interface into said first memory by control of said first processing unit.

14. A process for backing up a utility program of a robot controller connected to a system controller, said process comprising the steps of:
 applying a record signal in series format to a second interface by control of a second processing unit;
 receiving and converting in a first interface said record signal form said second interface into parallel data;

storing said parallel data into a first memory;

determining in a first processing unit if said utility program is stored in said first memory when said stored parallel data is representative of a command for writing;

re-editing said utility program from said first memory and supplying said re-edited utility program to said first interface;

receiving and converting in said second interface said re-edited utility program from said first interface into serial format;

storing said serial converted utility program into a second memory;

determining if a name of a utility program stored in a non-volatile memory is identical to a name of said utility program stored in said second memory; and if said name of the utility program stored in the non-volatile memory is not identical to the name of the utility program stored in said second memory, storing said utility program from the second memory into the non-volatile memory.

15. The process of claim 14, further comprising the steps of:

applying a retrieve signal to the second interface by control of said second processing unit;

reading said utility program stored in said non-volatile memory and transferring said read utility program to said second interface;

transferring said read utility program from said second interface to said first interface; and storing said read utility program from said first interface to said first memory.

16. A utility program backup device, comprising:

second interfacing means for receiving a series format record signal;

first interfacing means for providing a parallel format record signal by converting said series format record signal from said second interfacing means;

first storage means for storing said parallel format record signal;

means for determining if said utility program is stored in said first storage means when said parallel format record signal stored in said first storage means is a command for writing;

means for re-editing said utility program of said first storage means, and for supplying said re-edited utility program to said first interfacing means;

means for converting said re-edited utility program from said first interfacing means into serial format;

second storage means for storing said serial converted utility program of said means for converting;

means for determining if a name of a utility program stored in non-volatile memory means is identical to a name of said utility program stored in said second storage means; and means for storing said utility program from said second storage means into said non-volatile memory means when said name of the utility program stored in the non-volatile memory means is not identical to the name of the utility program stored in said second storage means.

17. The utility program backup device of claim 16, further comprising:

means for applying a retrieve signal to the second interfacing means;

means for reading said utility program stored in said non-volatile memory means and for transferring said read utility program to said second interfacing means;

means for transferring said read utility program from said second interfacing means to said first interfacing means; and means for storing said red utility program from said first interfacing means to said first storage means.

18. A utility program backup device for a robot controller connected to a system controller, said device comprising:

means for transmitting a backup command by transmitting the backup command in series from an interface of the system controller to an interface of the robot controller;

means for converting an utility program retrieved form a memory of the robot controller by converting said utility program from parallel to series format in said robot controller interface;

means for transferring said converted utility program by transferring said converted utility program from said robot controller interface to said system controller interface;

means for storing said converted utility program by storing said converted utility program from the system controller interface to a memory of said system controller; and means for writing by writing said utility program stored in said system controller memory onto an EPROM.

19. The device of claim 18, further comprising means for checking by checking whether a name of said utility program stored in said EPROM is identical to a name of said utility program stored in said system controller memory.

* * * * *

UNITED STATES PATENT AND TRADEMARK OFFICE
CERTIFICATE OF CORRECTION

PATENT NO. : 5,313,385
DATED : May 17, 1994
INVENTOR(S) : Whang

It is certified that error appears in the above-indentified patent and that said Letters Patent is hereby corrected as shown below:

IN THE ABSTRACT

[57] Abstract, Line 4          insert..,.. between "interfaces" and "a servo".

Column 2,    Line 6,     insert--a-- before "specific";

Line 57,    insert--Detailed--preceding "Description";

Column 4,    Line 5,     delete--,-- after "there";

Line 5,     delete--.-- preceding "program".

IN THE CLAIMS

Column 5,    Line 45,    change "red" to --read--;

Column 6,    Line 9,     change "form" to --from--;

Column 8,    Line 25,    change "red" to --read--;

UNITED STATES PATENT AND TRADEMARK OFFICE
CERTIFICATE OF CORRECTION

PATENT NO. : 5,313,385

DATED : May 17, 1994

INVENTOR(S) : Whang

It is certified that error appears in the above-indentified patent and that said Letters Patent is hereby corrected as shown below:

Column 8, Line 35, Change "form" to --from--.

Signed and Sealed this

Twentieth Day of September, 1994

Attest:

Attesting Officer

BRUCE LEHMAN

Commissioner of Patents and Trademarks